(12) United States Patent
Komatsu et al.

(10) Patent No.: US 10,486,658 B2
(45) Date of Patent: Nov. 26, 2019

(54) BICYCLE OPERATING DEVICE

(71) Applicant: SHIMANO INC., Sakai (JP)

(72) Inventors: Atsushi Komatsu, Sakai (JP);
Takafumi Nishino, Sakai (JP);
Takehiko Nakajima, Sakai (JP)

(73) Assignee: SHIMANO INC., Sakai (JP)

( * ) Notice: Subject to any disclaimer, the term of this patent is extended or adjusted under 35 U.S.C. 154(b) by 144 days.

(21) Appl. No.: 15/135,492

(22) Filed: Apr. 21, 2016

(65) Prior Publication Data
US 2017/0305394 A1    Oct. 26, 2017

(51) Int. Cl.
| | |
|---|---|
| *B60T 7/08* | (2006.01) |
| *B60T 7/10* | (2006.01) |
| *B62K 23/06* | (2006.01) |
| *B62L 3/02* | (2006.01) |

(52) U.S. Cl.
CPC ............. *B60T 7/085* (2013.01); *B60T 7/102* (2013.01); *B62K 23/06* (2013.01); *B62L 3/02* (2013.01)

(58) Field of Classification Search
CPC ....... B62M 25/04; B62M 25/08; B60T 7/102; B62L 3/02; B62K 23/06
See application file for complete search history.

(56) References Cited

U.S. PATENT DOCUMENTS

| | | | |
|---|---|---|---|
| 5,470,277 A | 11/1995 | Romano | |
| 6,619,154 B2 * | 9/2003 | Campagnolo | B62M 25/08 |
| | | | 74/489 |
| 6,698,567 B2 * | 3/2004 | Dal Pra' | B62M 25/04 |
| | | | 192/217 |
| 6,991,081 B2 | 1/2006 | Uno et al. | |
| 7,760,078 B2 | 7/2010 | Miki et al. | |
| 7,874,229 B2 | 1/2011 | Tetsuka | |
| 7,908,940 B2 | 3/2011 | Naka et al. | |
| 8,286,529 B2 | 10/2012 | Tetsuka | |

(Continued)

FOREIGN PATENT DOCUMENTS

| | | |
|---|---|---|
| CN | 1327930 | 12/2001 |
| CN | 101445143 | 6/2009 |

(Continued)

OTHER PUBLICATIONS

Office Action with Form PTO-892 Notice of References Cited issued by the United States Patent and Trademark Office for the co-pending U.S. Appl. No. 15/135,488, dated Apr. 17, 2018.

(Continued)

*Primary Examiner* — Thomas C Diaz
(74) *Attorney, Agent, or Firm* — Mori & Ward, LLP

(57) ABSTRACT

A bicycle operating device comprises a base member, a brake operating member, an electrical switch, and a wireless communication unit. The brake operation member is movably coupled to the base member. The brake operating member is movable relative to the base member in a first direction and movable relative to the base member in a second direction different from the first direction. The electrical switch is to provide an electric signal in response to a movement of the brake operating member in the second direction. The electrical switch is disposed at one of the base member and the brake operating member. The wireless communication unit is connected to the electrical switch to transmit a wireless signal based on the electric signal.

20 Claims, 10 Drawing Sheets

(56) References Cited

U.S. PATENT DOCUMENTS

| | | | |
|---|---|---|---|
| 8,539,856 B2* | 9/2013 | Watarai | B62K 23/06 74/502.2 |
| 8,549,955 B2 | 10/2013 | Sato et al. | |
| 8,655,561 B2 | 2/2014 | Kitamura | |
| 8,909,424 B2 | 12/2014 | Jordan et al. | |
| 8,931,365 B2 | 1/2015 | Fujii et al. | |
| 9,045,193 B2* | 6/2015 | Dal Pra' | B62K 23/06 |
| 9,056,651 B2 | 6/2015 | Tetsuka | |
| 9,191,038 B2 | 11/2015 | Abe et al. | |
| 9,211,936 B2 | 12/2015 | Gao | |
| 9,321,505 B2 | 4/2016 | Miki | |
| 2005/0099277 A1 | 5/2005 | Hsu | |
| 2008/0180233 A1 | 7/2008 | Miglioranza | |
| 2009/0315692 A1 | 12/2009 | Miki et al. | |
| 2011/0074568 A1 | 3/2011 | Li | |
| 2011/0079453 A1 | 4/2011 | Wanger et al. | |
| 2012/0221205 A1 | 8/2012 | Ichida et al. | |
| 2013/0061705 A1 | 3/2013 | Jordan | |
| 2013/0151073 A1 | 6/2013 | Tetsuka | |
| 2013/0180815 A1 | 7/2013 | Dunlap et al. | |
| 2014/0015659 A1 | 1/2014 | Tetsuka | |
| 2014/0053675 A1 | 2/2014 | Tetsuka | |
| 2014/0144275 A1 | 5/2014 | Kariyama et al. | |
| 2014/0214285 A1 | 7/2014 | Wesling | |
| 2014/0352478 A1 | 12/2014 | Gao | |
| 2015/0203169 A1* | 7/2015 | Nishino | B62K 23/06 74/491 |
| 2015/0259025 A1 | 9/2015 | Sala et al. | |
| 2015/0284049 A1 | 10/2015 | Shipman et al. | |
| 2015/0367176 A1 | 12/2015 | Bejestan et al. | |
| 2017/0305488 A1 | 10/2017 | Komatsu et al. | |
| 2017/0305489 A1 | 10/2017 | Komatsu et al. | |
| 2017/0305491 A1 | 10/2017 | Komatsu et al. | |
| 2018/0057102 A1 | 3/2018 | Komatsu et al. | |
| 2018/0057103 A1 | 3/2018 | Komatsu et al. | |
| 2018/0057104 A1 | 3/2018 | Komatsu et al. | |
| 2018/0057105 A1 | 3/2018 | Komatsu et al. | |

FOREIGN PATENT DOCUMENTS

| | | |
|---|---|---|
| CN | 101607581 | 12/2009 |
| CN | 103204219 | 7/2013 |
| CN | 103625593 | 3/2014 |
| CN | 103847923 | 6/2014 |
| CN | 104210612 | 12/2014 |
| CN | 104787209 | 7/2015 |
| CN | 104973207 | 10/2015 |
| DE | 202011005403 U1 | 8/2011 |
| EP | 3018048 | 5/2016 |
| FR | 2809703 | 12/2001 |
| TW | 201536620 | 10/2015 |

OTHER PUBLICATIONS

Office Action issued by the United States Patent and Trademark Office for the co-pending U.S. Appl. No. 15/135,498, dated Jun. 13, 2018.

Office Action issued by the United States Patent and Trademark Office for the co-pending U.S. Appl. No. 15/135,475, dated Jun. 18, 2018.

Office Action with Form PTO-892 Notice of References Cited issued by the United States Patent and Trademark Office for the co-pending U.S. Appl. No. 15/135,469, dated Feb. 23, 2018.

Office Action with Form PTO-892 Notice of References Cited issued by the United States Patent and Trademark Office for the co-pending U.S. Appl. No. 15/135,475, dated Feb. 23, 2018.

Office Action with Form PTO-892 Notice of References Cited issued by the United States Patent and Trademark Office for the co-pending U.S. Appl. No. 15/135,486, dated Mar. 5, 2018.

Office Action with Form PTO-892 Notice of References Cited issued by the United States Patent and Trademark Office for the co-pending U.S. Appl. No. 15/135,498, dated Nov. 20, 2017.

Office Action issued by the United States Patent and Trademark Office for the co-pending U.S. Appl. No. 15/135,498, dated Oct. 31, 2017.

Office Action issued by the United States Patent and Trademark Office for the co-pending U.S. Appl. No. 15/135,498, dated Aug. 17, 2017.

Office Action with Form PTO-892 Notice of References Cited issued by the United States Patent and Trademark Office for the co-pending U.S. Appl. No. 15/135,498, dated Apr. 24, 2017.

Office Action with Form PTO-892 Notice of References Cited issued by the United States Patent and Trademark Office forthe co-pending U.S. Appl. No. 15/135,486, dated Jul. 30, 2018

Office Action issued by the United States Patent and Trademark Office for the co-pending U.S. Appl. No. 15/135,488, dated Sep. 12, 2018.

Office Action with Form PTO-892 Notice of References Cited issued by the United States Patent and Trademark Office for the co-pending U.S. Appl. No. 15/135,481, dated Sep. 28, 2018

Office Action with Form PTO-892 Notice of References Cited issued by the United States Patent and Trademark Office forthe co-pending U.S. Appl. No. 15/135,475, dated Jan. 8, 2019

Office Action issued by the United States Patent and Trademark Office for the co-pending U.S. Appl. No. 15/135,488, dated Dec. 19, 2018.

Office Action issued by the United States Patent and Trademark Office for the co-pending U.S. Appl. No. 15/135,486, dated Nov. 13, 2018.

Office Action issued by the United States Patent and Trademark Office for the co-pending U.S. Appl. No. 15/135,498, dated Nov. 16, 2018.

Office Action with Form PTO-892 Notice of References Cited issued by the United States Patent and Trademark Office for the co-pending U.S. Appl. No. 15/135,498, dated Dec. 10, 2018

Office Action issued by the United States Patent and Trademark Office for the co-pending U.S. Appl. No. 15/135,488, dated Mar. 5, 2019

Office Action issued by the United States Patent and Trademark Office for the co-pending U.S. Appl. No. 15/135,498, dated Apr. 2, 2019.

Office Action issued by the United States Patent and Trademark Office for the co-pending U.S. Appl. No. 15/135,481, dated Apr. 8, 2019.

Define may be—Google search, google.com., Apr. 1, 2019, See Cite No. 9.

Define front side—Google search, google.com., Apr. 1, 2019, See Cite No. 9.

\* cited by examiner

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device.

SUMMARY OF THE INVENTION

In accordance with a first aspect of the present invention, a bicycle operating device comprises a base member, a brake operating member, an electrical switch, and a wireless communication unit. The brake operation member is movably coupled to the base member. The brake operating member is movable relative to the base member in a first direction and movable relative to the base member in a second direction different from the first direction. The electrical switch is to provide an electric signal in response to a movement of the brake operating member in the second direction. The electrical switch is disposed at one of the base member and the brake operating member. The wireless communication unit is connected to the electrical switch to transmit a wireless signal based on the electric signal.

With the bicycle operating device according to the first aspect, it is possible to move the brake operating member in the second direction to turn on the electrical switch for a different operation (e.g. gear shift, seatpost operation, and electric suspension operation) from a braking operation. This can simplify the structure of the bicycle operating device for at least two operations. The bicycle operating device also enables to wirelessly operate the electrical bicycle component with a simple structure.

In accordance with a second aspect of the present invention, the bicycle operating device according to the first aspect is configured so that the wireless communication unit is disposed at one of the base member and the brake operating member.

With the bicycle operating device according to the second aspect, it is possible to handle the bicycle operating device having the wireless communication unit and the electrical switch in a single unit or in two different units that are disposed adjacent to each other and connected by a short electrical wire.

In accordance with a third aspect of the present invention, the bicycle operating device according to one of the above aspects is configured so that the electrical switch is disposed at the base member, and that the brake operating member includes an actuation part disposed to face the electrical switch in the second direction to press the electrical switch in response to a relative movement occurring between the brake operating member and the base member.

With the bicycle operating device according to the third aspect, it is possible to easily press the electrical switch using the relative movement occurring between the brake operating member and the base member.

In accordance with a fourth aspect of the present invention, the bicycle operating device according to one of the above aspects is configured so that the actuation part includes a projection to face the electrical switch.

With the bicycle operating device according to the fourth aspect, it is possible to transmit the relative movement occurring between the brake operating member and the base member to the electrical switch using the projection.

In accordance with a fifth aspect of the present invention, the bicycle operating device according to one of the above aspects is configured so that the electrical switch is disposed at the brake operating member, and that the base member includes an actuation part disposed to face the electrical switch in the second direction to press the electrical switch in response to a relative movement occurring between the brake operating member and the base member.

With the bicycle operating device according to the fifth aspect, it is possible to easily press the electrical switch using the relative movement occurring between the brake operating member and the base member.

In accordance with a sixth aspect of the present invention, the bicycle operating device according to one of the above aspects is configured so that the actuation part includes a projection to face the electrical switch.

With the bicycle operating device according to the sixth aspect, it is possible to transmit the relative movement occurring between the brake operating member and the base member to the electrical switch using the projection.

In accordance with a seventh aspect of the present invention, the bicycle operating device according to one of the above aspects further comprises a cable operating structure coupled to the brake operating member to move a mechanical control cable in response to a movement of the brake operating member in the first direction.

With the bicycle operating device according to the seventh aspect, it is possible to respectively perform the braking operation and the different operation via the mechanical control cable and the wireless communication.

In accordance with an eighth aspect of the present invention, the bicycle operating device according to one of the above aspects further comprises a hydraulic unit coupled to the brake operating member to generate a hydraulic pressure in response to a movement of the brake operating member in the first direction.

With the bicycle operating device according to the eighth aspect, it is possible to respectively perform the braking operation and the different operation via the hydraulic fluid and the wireless communication.

In accordance with a ninth aspect of the present invention, the bicycle operating device according to one of the above aspects further comprises an informing unit disposed on at least one of the base member and the brake operating member.

With the bicycle operating device according to the ninth aspect, it is possible to inform a user of information relating to the bicycle operating device.

In accordance with a tenth aspect of the present invention, the bicycle operating device according to one of the above aspects is configured so that the informing unit is connected to the wireless communication unit to inform a user of a status of the wireless communication unit.

With the bicycle operating device according to the tenth aspect, it is possible to check the status of the wireless communication unit.

In accordance with an eleventh aspect of the present invention, the bicycle operating device according to one of the above aspects is configured so that the base member includes a first end portion and a second end portion. The first end portion is configured to be coupled to a handlebar in a mounting state where the bicycle operating device is mounted to the handlebar. The second end portion is opposite to the first end portion. The brake operating member is movably coupled to the second end portion.

With the bicycle operating device according to the eleventh aspect, it is possible to provide a distance between the handlebar and the brake operating member. Accordingly, it is possible to prevent interference between the handlebar and the brake operating member.

In accordance with a twelfth aspect of the present invention, the bicycle operating device according to one of the above aspects is configured so that the first end portion includes a mounting surface having a curved shape corresponding to a drop-down handlebar.

With the bicycle operating device according to the twelfth aspect, it is possible to firmly fix the bicycle operating device to the drop-down handlebar.

In accordance with a thirteenth aspect of the present invention, the bicycle operating device according to one of the above aspects is configured so that the base member includes a grip portion arranged between the first end portion and the second end portion.

With the bicycle operating device according to the thirteenth aspect, the grip portion allows the user to easily operate the brake operating member.

In accordance with a fourteenth aspect of the present invention, the bicycle operating device according to one of the above aspects is configured so that the second end portion includes a pommel portion.

With the bicycle operating device according to the fourteenth aspect, the pommel portion allows the user to lean on the base member during riding a bicycle.

In accordance with a fifteenth aspect of the present invention, the bicycle operating device according to one of the above aspects is configured so that the first end portion is configured to be coupled to a bar end of a handlebar in the mounting state.

With the bicycle operating device according to the fifteenth aspect, it is possible to utilize the bicycle operating device as a bar-end operating device.

In accordance with a sixteenth aspect of the present invention, the bicycle operating device according to one of the above aspects further comprises a power supply electrically connected to at least one of the electrical switch and the wireless communication unit.

With the bicycle operating device according to the sixteenth aspect, it is possible to supply electric power to the at least one of the electrical switch and the wireless communication unit.

In accordance with a seventeenth aspect of the present invention, the bicycle operating device according to one of the above aspects is configured so that the power supply is disposed on at least one of the base member and the brake operating member.

With the bicycle operating device according to the seventeenth aspect, it is possible to handle the bicycle operating device having the wireless communication unit, the electrical switch, and the power supply in a single unit or in two different units that are disposed adjacent to each other and connected by a short electrical wire.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
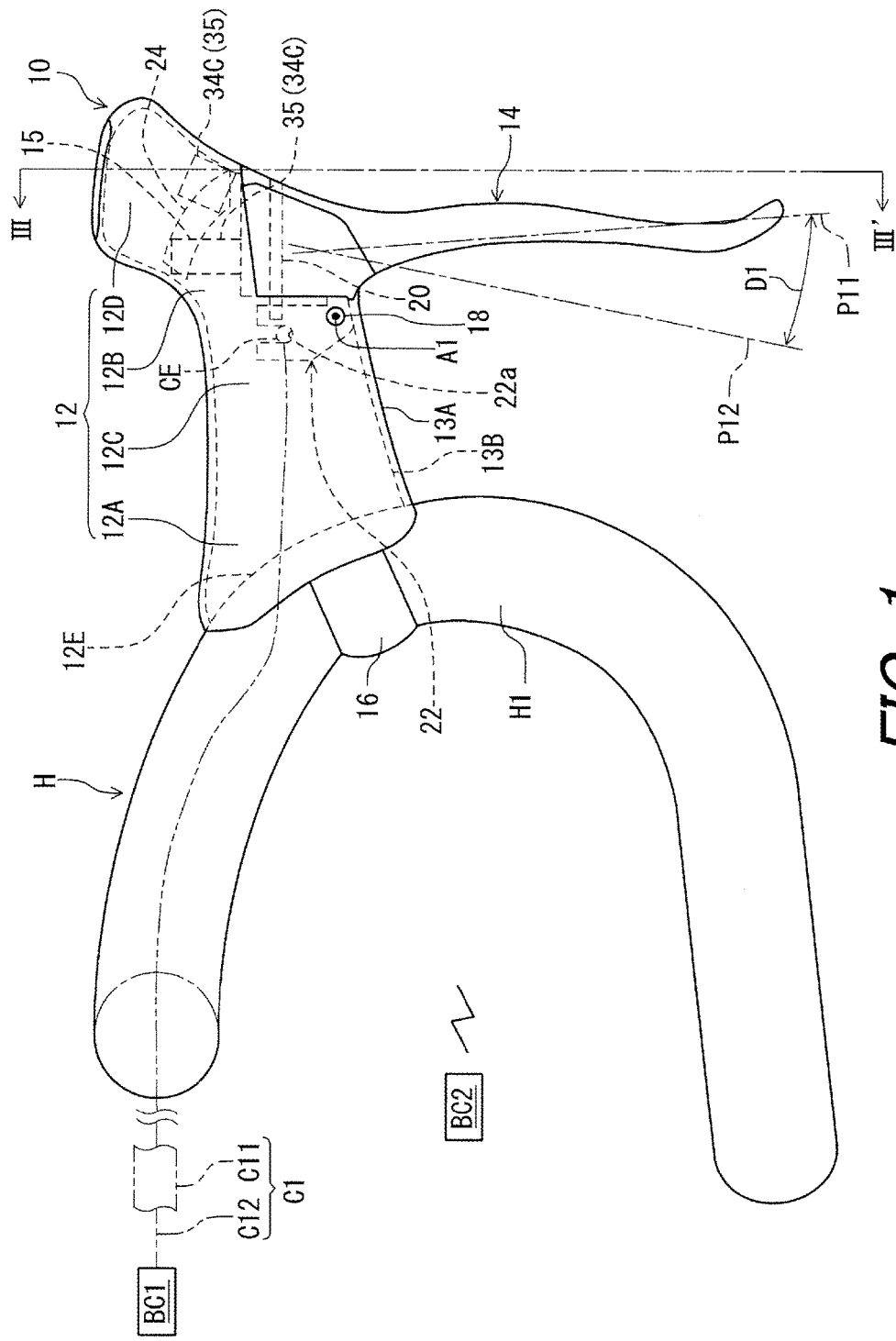
FIG. 1 is a right side elevational view of a bicycle handle provided with a bicycle operating device in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a handlebar H. In this embodiment, the bicycle operating device 10 is configured to be mounted to a drop-down handlebar. However, structures of the bicycle operating device 10 can be applied to other operating devices mounted to other type of handlebars such as a flat handlebar, a time trial handlebar, and a bull horn handlebar. The handlebar H can also be referred to as the drop-down handlebar H.

The bicycle operating device 10 is operatively coupled to a bicycle brake BC1. In this embodiment, the bicycle operating device 10 is operatively coupled to the bicycle brake BC1 via a control element C1. While the control element C1 is a mechanical control cable in this embodiment, the control element C1 can be other elements such as a hydraulic hose and an electric control cable. The control element C1 can also be referred to as the mechanical control cable C1.

Furthermore, the bicycle operating device 10 is operatively connected to the electrical bicycle component BC2 via wireless communication. Examples of the electrical bicycle component BC2 include an electric shifting device, an electric suspension, and an electric seatpost. In this embodiment, the bicycle operating device 10 is operatively connected to an electric shifting device as the electrical bicycle component BC2 via wireless communication. The electrical bicycle component BC2 can also be referred to as the electric shifting device BC2. Examples of the electric shifting device BC2 include a derailleur and an internal-gear hub.

In this embodiment, the bicycle operating device 10 is a right hand side control device configured to be operated by the rider's right hand to actuate the bicycle brake BC1 and the electrical bicycle component BC2. However, the structures of the bicycle operating device 10 can be applied to a left hand side control device.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing the handlebar H. Accordingly, these terms, as utilized to describe the bicycle operating device 10, should be interpreted relative to the bicycle equipped with the bicycle operating device 10 as used in an upright riding position on a horizontal surface.

Figure 2:
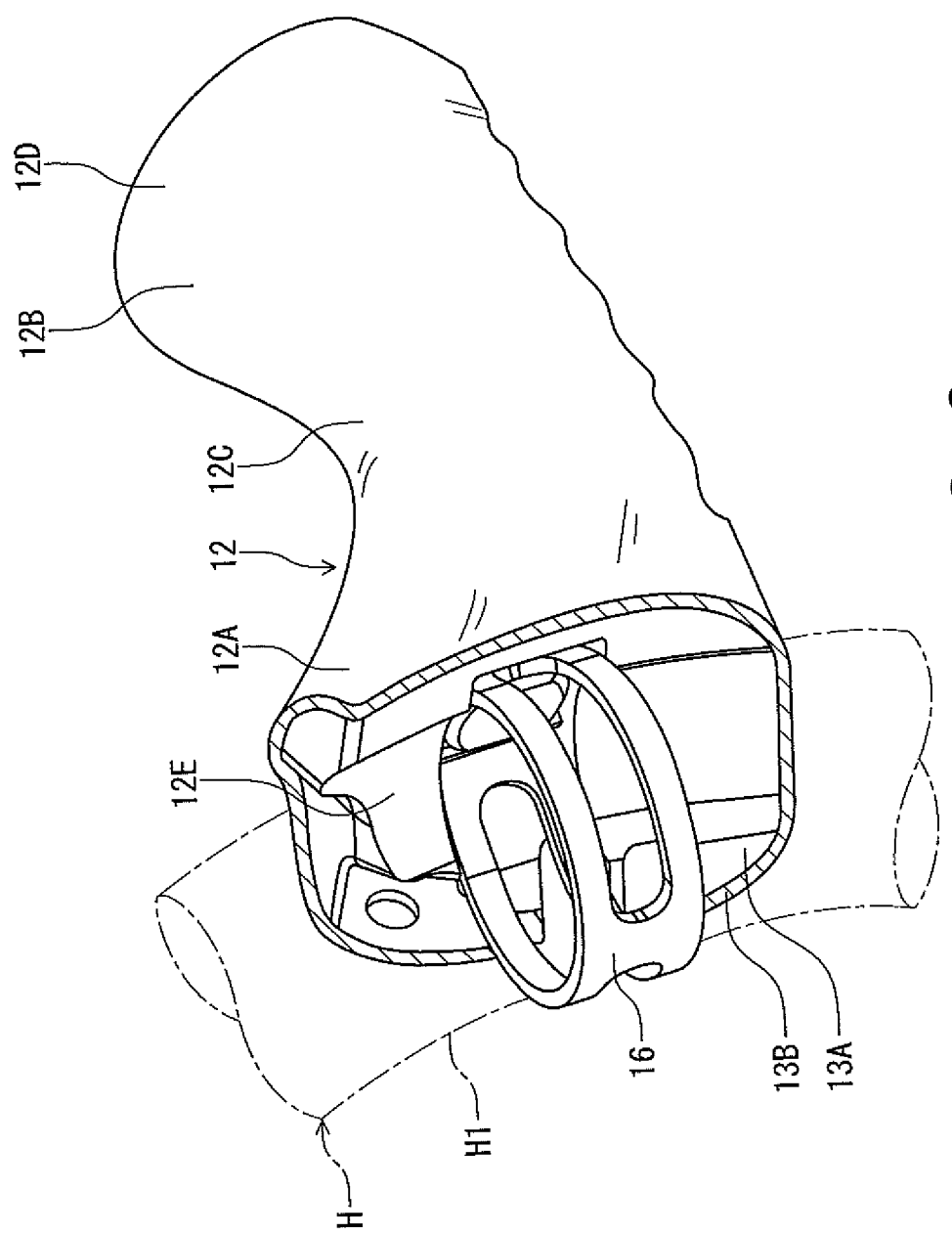
FIG. 2 is a partial perspective view of the bicycle operating device illustrated in FIG. 1.

As seen in FIG. 1, the bicycle operating device 10 comprises a base member 12 and a brake operating member 14. The base member 12 includes a first end portion 12A and a second end portion 12B. The first end portion 12A is configured to be coupled to the handlebar H in a mounting state where the bicycle operating device 10 is mounted to the handlebar H. The drop-down handlebar H includes a curved part H1. The first end portion 12A is configured to be coupled to the curved part H1 in the mounting state where the bicycle operating device 10 is mounted to the handlebar H. The bicycle operating device 10 comprises a mounting clamp 16 to couple the base member 12 to the handlebar H. As seen in FIG. 2, the first end portion 12A includes a mounting surface 12E having a curved shape corresponding to the drop-down handlebar H. Specifically, the mounting surface 12E has the curved shape corresponding to an outer peripheral surface of the curved part H1.

As seen in FIGS. 1 and 2, the second end portion 12B is opposite to the first end portion 12A. The base member 12 includes a grip portion 12C arranged between the first end portion 12A and the second end portion 12B. The second end portion 12B includes a pommel portion 12D. The pommel portion 12D extends obliquely upward from the grip portion 12C. The pommel portion 12D is disposed at a position higher than a position of the first end portion 12A in the mounting state of the bicycle operating device 10.

In this embodiment, the base member 12 includes a base body 13A and a grip cover 13B. The grip cover 13B at least partly covers the base body 13A. The first end portion 12A, the second end portion 12B, the grip portion 12C, and the pommel portion 12D are constituted by at least one of the base body 13A and the grip cover 13B. The grip cover 13B can be omitted from the base member 12.

Figure 3:
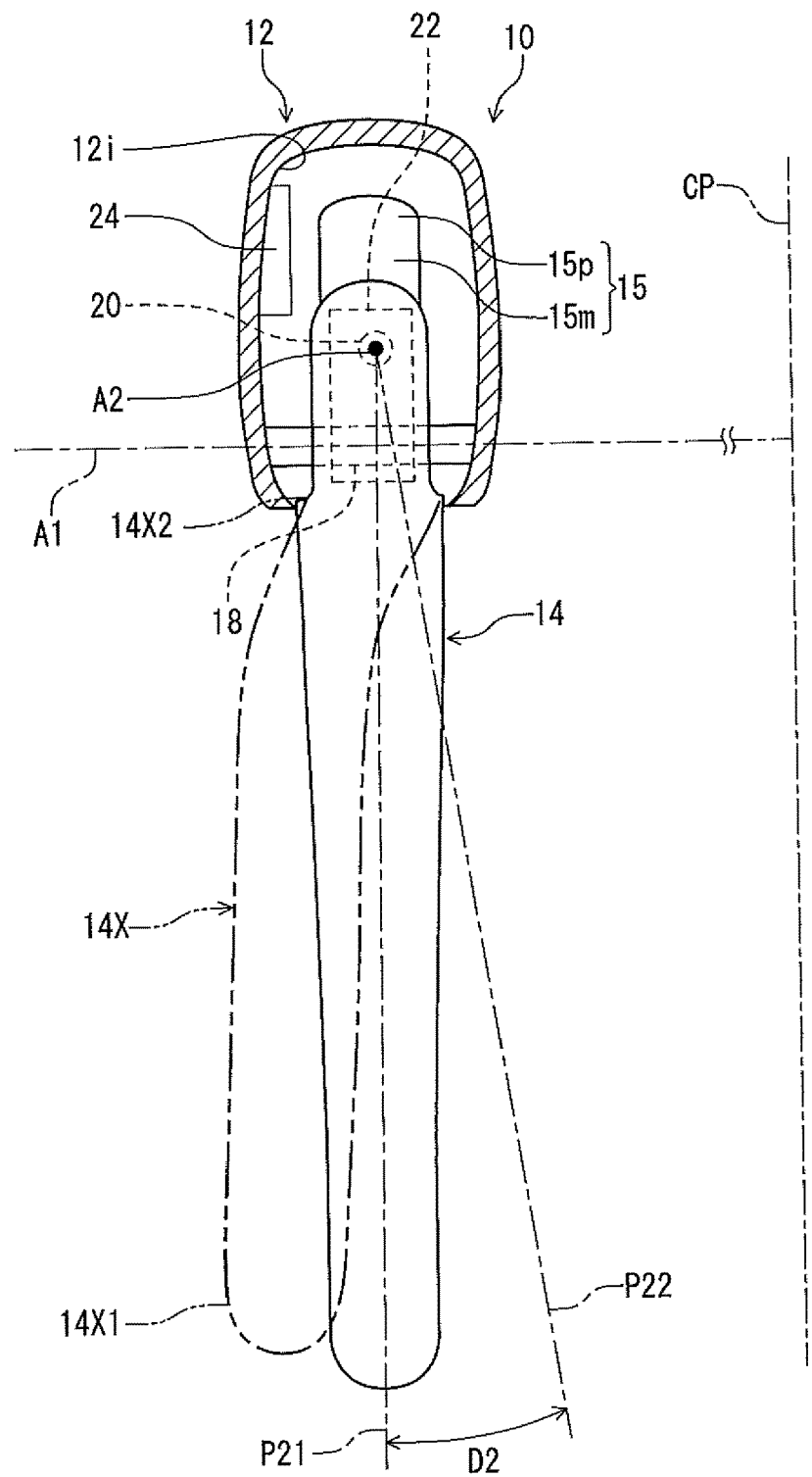
FIG. 3 is a cross-sectional view of the bicycle operating device taken along line of FIG. 1.

As seen in FIGS. 1 and 3, the brake operating member 14 is movably coupled to the base member 12. The brake operating member 14 is movably coupled to the second end portion 12B. The brake operating member 14 is movable relative to the base member 12 in the first direction D1 and movable relative to the base member 12 in the second direction D2 different from the first direction D1 FIG. 3 shows the second direction D2 indicates an anticlockwise direction (a leftward direction) viewed from the front of the bicycle operating device 10, but the second direction D2 may be an clockwise direction (a rightward direction) viewed from the front of the bicycle operating device 10.

Specifically, the brake operating member 14 is pivotable relative to the base member 12 about a first pivot axis A1 in the first direction D1 to perform a braking operation. The brake operating member 14 is pivotable relative to the base member 12 between a first rest position P11 and a first operated position P12. In this embodiment, the first direction D1 is a circumferential direction defined about the first pivot axis A1. The brake operating member 14 is pivotable relative to the base member 12 about a second pivot axis A2 in the second direction D2 to perform a gear shifting operation. The brake operating member 14 is pivotable relative to the base member 12 between a second rest position P21 and a second operated position P22. In this embodiment, the second direction D2 is a circumferential direction defined about the second pivot axis A2.

In the present application, the term "rest position" as used herein refers to a position at which a movable part such as the brake operating member 14 remains stationary in a state where the brake operating member 14 is not operated by the user. Therefore, the first rest position P11 may be the same as the second rest position P21. The term "operated position" as used herein refers to a position at which the brake operating member 14 has been operated by the user to perform the operation of the bicycle component.

The brake operating member 14 is pivotally coupled to the base member 12 via a first pivot pin 18, a second pivot pin 20, and a cable operating structure 22. The first pivot pin 18 defines the first pivot axis A1. The second pivot pin 20 defines the second pivot axis A2. The second pivot axis A2 is preferably orthogonal to the first pivot axis A1, but the second pivot axis A2 may be non-orthogonal to the first pivot axis A1. Specifically, the brake operating member 14 is pivotally coupled to the second pivot pin 20 to be rotated about the second pivot axis A2 in response to a movement of the brake operating member 14 in the second direction D2. The second pivot pin 20 is fixed to a cable operating structure 22. The cable operating structure 22 is rotatably supported by the first pivot pin 18 to be rotated about the first pivot axis A1 with the brake operating member 14 in response to a movement of the brake operating member 14 in the first direction D1. The first pivot pin 18 is secured to the base member 12.

The brake operating member 14 is biased by a first biasing member (not shown) toward the first rest position P11 from the first operated position P12 relative to the base member 12. Thus, the brake operating member 14 is at the first rest position P11 in a state where the brake operating member 14 is not operated by the user. The brake operating member 14 is biased by a second biasing member (not shown) toward the second rest position P21 from the second operated position P22 relative to the base member 12. Thus, the brake operating member 14 is at the first rest position P11 (the second rest position P21) in a state where the brake operating member 14 is not operated by the user.

While the brake operating member 14 is used as a shift operating member in response to a movement of the brake operating member 14 in the second direction D2 in this embodiment, the brake operating member 14 can be used as an operating member other than the shift operating member. For example, the brake operating member 14 can be used as a suspension operating member in a case where the electrical bicycle component includes the electric suspension. The brake operating member 14 can be used as a seatpost operating member in a case where the electrical bicycle component includes the electric seatpost.

As indicated with a two-dot chain line 14X in FIG. 3, the brake operating member 14 can have a curved shape such that a distal end portion 14X1 of the brake operating member 14 is offset from a proximal end portion 14X2 of the brake operating member 14. In FIG. 3, the distal end portion 14X1 is offset from the proximal end portion 14X2 toward an opposite side of a bicycle transverse center plane CP of a bicycle.

As seen in FIGS. 1 and 3, the bicycle operating device 10 further comprises the cable operating structure 22 coupled to the brake operating member 14 to move the mechanical control cable C1 in response to a movement of the brake operating member 14 in the first direction D1. The mechanical control cable C1 includes an outer casing C11 and an inner wire C12 movably provided in the outer casing C11. In this embodiment, the cable operating structure 22 is provided on an end of the brake operating member 14 to receive an end of the inner wire C12 of the mechanical control cable C1.

As seen in FIG. 1, the cable operating structure 22 is coupled to the end CE of the inner wire C12 of the mechanical control cable C1. Specifically, the cable operating structure 22 includes a cable attachment part 22a to couple the brake operating member 14 to the mechanical control cable C1.

As seen in FIGS. 1 and 3, the bicycle operating device 10 comprises an electrical switch 24 to provide an electric signal in response to a movement of the brake operating member 14 in the second direction D2. The electrical switch 24 is disposed at one of the base member 12 and the brake operating member 14. In this embodiment, as seen in FIG. 3, the electrical switch 24 is disposed at the base member 12.

While the electrical switch 24 is used as a shift control switch in this embodiment, the electrical switch 24 can be used as a switch other than the shift control switch. For example, the brake operating member 14 can be used as a suspension control switch in a case where the electrical bicycle component BC2 includes the electric suspension. The brake operating member 14 can be used as a seatpost control member in a case where the electrical bicycle component BC2 includes the electric seatpost.

As seen in FIGS. 1 and 3, the brake operating member 14 includes an actuation part 15. The actuation part 15 is disposed inside the base member 12. A electrical switch 24 is attached to an inner surface 12i of base member 12. The actuation part 15 is disposed to face the electrical switch 24 in the second direction D2 to press the electrical switch 24 in response to a relative movement occurring between the brake operating member 14 and the base member 12.

As seen in FIGS. 1 and 3, the actuation part 15 includes a projection 15p to face the electrical switch 24. In the FIG. 3, the projection 15p protrudes upwardly from the actuation part main body 15m, and the projection 15p faces the electrical switch 24 when the brake operating member 14 is moved in the second direction D2. However, the projection 15p may protrude toward the electrical switch 24 from the actuation part main body 15m, and the projection 15p may face the electrical switch 24 even when the brake operating member 14 is at the second rest position P21.

The electrical switch 24 is in contact with the projection 15p in a state where the brake operating member 14 is at the second operated position P22. The electrical switch 24 is turned on when the brake operating member 14 is pivoted from the second rest position P21 to the second operated position P22. The electrical switch 24 is turned off when the brake operating member 14 is returned to the second rest position P21.

Figure 4:
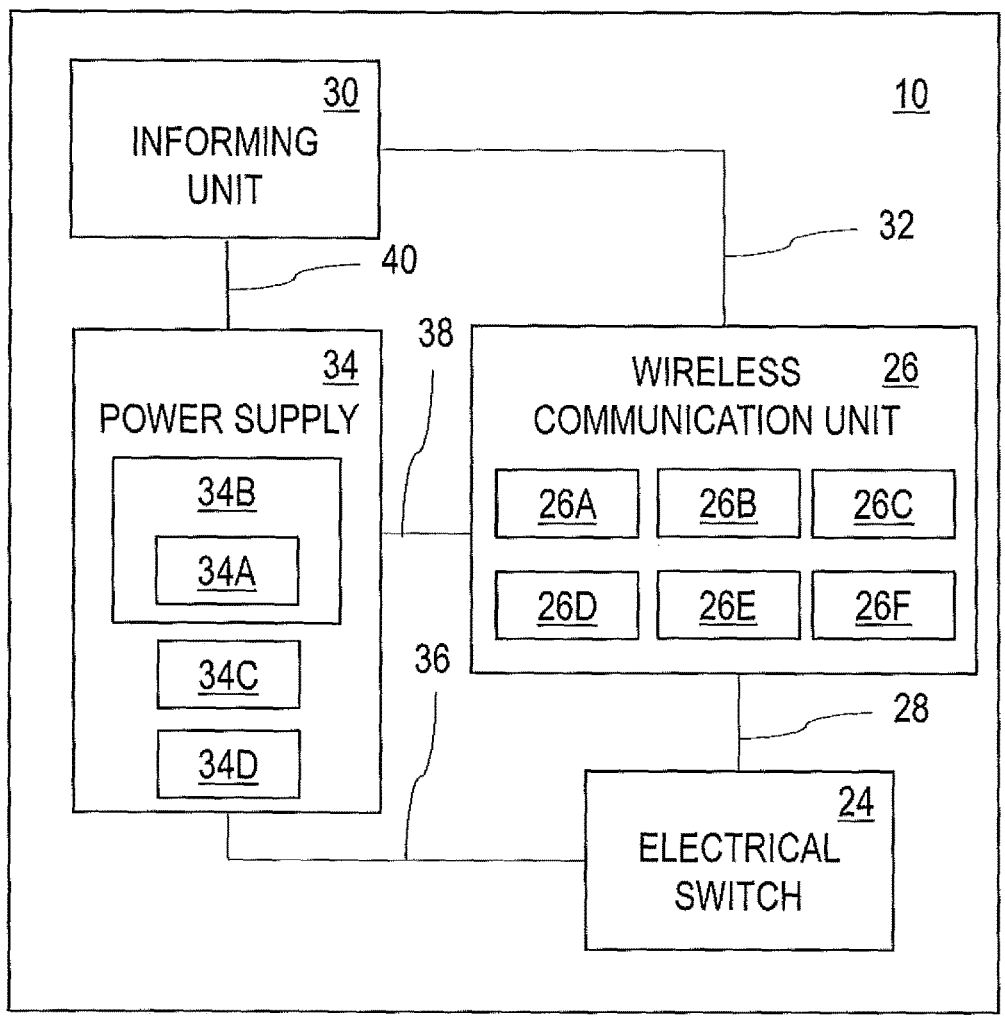
FIG. 4 is a schematic block diagram of the bicycle operating device illustrated in FIG. 1.

As seen in FIG. 4, the bicycle operating device 10 comprises a wireless communication unit 26 connected to the electrical switch 24 to transmit a wireless signal based on the electric signal. The wireless communication unit 26 is disposed at one of the base member 12 and the brake operating member 14. In this embodiment, when the wireless communication unit 26 is disposed at the base member 12, the wireless communication unit 26 may be integrally provided with the electrical switch 24 as a single unit. When the wireless communication unit 26 is disposed at the brake operating member 14, the wireless communication unit 26 is electrically connected to the electrical switch 24 via the electrical cable 28. The wireless communication unit 26 receives the electric signal provided by the electrical switch 24 to transmit a wireless signal based on the electric signal. The bicycle operating device 10 may further comprise an antenna connected to the wireless communication unit 26, which is not shown in the drawings. Alternatively, the wireless communication unit 26 may include the antenna. The antenna may be mounted on the electronic substrate on which the wireless communication unit 26 is mounted. The wireless communication unit 26 wirelessly transmits the wireless signal based on the electric signal via the antenna.

In this embodiment, the wireless communication unit 26 includes a processor 26A, a memory 26B, a signal generating circuit 26C, a signal transmitting circuit 26D, and a signal receiving circuit 26E. Thus, the wireless communication unit 26 can also be referred to as a wireless communication circuit 26 in the present application. The processor 26A includes a central processing unit (CPU) and a memory controller. The memory 26B is connected to the processor 26A. The memory 26B includes a read only memory (ROM) and a random access memory (RAM). The ROM includes a non-transitory computer-readable storage medium. The RAM includes a transitory computer-readable storage medium. The memory 26B includes storage areas each having an address in the ROM and the RAM. The processor 26A controls the memory 26B to store data in the storage areas of the memory 26B and reads data from the storage areas of the memory 26B. The memory 26B (e.g., the ROM) stores a program. The program is read into the processor 26A, and thereby functions of the wireless communication unit 26 (e.g., at least part of functions of the signal generating circuit 26C and the signal transmitting circuit 26D).

The signal generating circuit 26C generates wireless signals based on the electric signal input from the electrical switch 24. The signal generating circuit 26C superimposes digital signals on carrier wave using a predetermined wireless communication protocol to generate the wireless signals. The signal transmitting circuit 26D transmits the wireless signal via the antenna in response to the electric signal input from the electrical switch 24.

In this embodiment, the signal generating circuit 26C can encrypt control information (e.g., shift information) to generate encrypted wireless signals. The signal generating circuit 26C can encrypt digital signals stored in the memory 26B using a cryptographic key. The signal transmitting circuit 26D can transmit the encrypted wireless signals. Thus, the wireless communication unit 26 wirelessly transmits the wireless signal to upshift or downshift the electric shifting device BC2 when the electrical switch 24 is turned on. However, the wireless communication unit 26 can be configured to transmit a wireless signal to control other electrical bicycle components such as the electric suspension and the electric seatpost.

Further, the signal receiving circuit 26E receives a wireless signal from the electric shifting device BC2 via the antenna. In this embodiment, the signal receiving circuit 26E decodes the wireless signal to recognize information wirelessly transmitted from the electric shifting device BC2. When the received wireless signal is encrypted using a cryptographic key, the signal receiving circuit 26E can decrypt the wireless signal using the cryptographic key. Namely, the wireless communication unit 26 is configured to transmit a wireless signal to control other electrical bicycle components and to receive a wireless signal to recognize information from the other electrical bicycle components. In other words, the wireless communication unit 26 is provided as a wireless transmitter and a wireless receiver. The other electrical bicycle components can include the electric suspension and the electric seatpost in addition to the electric shifting device BC2. In this embodiment, the wireless communication unit 26 is integrally provided as a single module or unit. However, the wireless communication unit 26 can be constituted of a wireless transmitter and a wireless receiver which are provided as separate modules or units arranged at different positions from each other. The signal receiving circuit 26E can be omitted from the wireless communication unit 26.

As seen in FIG. 4, the bicycle operating device 10 further comprises an informing unit 30. The informing unit 30 is disposed on at least one of the base member 12 and the brake operating member 14. In this embodiment, when the informing unit 30 and the wireless communication unit 26 are disposed at the same member out of the base member 12 and the brake operating member 14, the informing unit 30 may be integrally provided with the wireless communication unit 26 as a single unit. When the informing unit 30 and the wireless communication unit 26 are disposed at different members, the informing unit 30 is electrically connected to the wireless communication unit 26 via the electrical cable 32. In addition, the bicycle operating device 10 may comprise at least two informing units 30. In this case, at least one of the at least two informing units 30 may be disposed at the base member 12 and the rest of the at least two informing units 30 may be disposed at the brake operating member 14.

Preferably, the informing unit 30 is connected to the wireless communication unit 26 to inform a user of a status of the wireless communication unit 26. However, the informing unit 30 may inform a user of a status of another bicycle component such as the electric shifting device and a power supply 34. When the bicycle operating device 10 may comprise at least two informing units 30, one of the at least two informing units 30 may inform a user of a status of the wireless communication unit 26 and another of the at least two informing units 30 may inform a status of another bicycle component. The informing unit 30 includes a light emitting element such as a light emitting diode (LED). However, the informing unit 30 can include other elements such as a buzzer and/or an output interface to a cycle computer attached to the handlebar H via which the status is transmitted instead of or in addition to the light emitting element. Light from the informing unit 30 is visible from outside of the bicycle operating device 10 via a clear window which is not shown in the drawings.

As seen in FIG. 4, the bicycle operating device 10 further comprises a power supply 34 electrically connected to at least one of the electrical switch 24 and the wireless communication unit 26. The power supply 34 is disposed on at least one of the base member 12 and the brake operating member 14. The power supply 34 may be further connected to the informing unit 30. In addition, the bicycle operating device 10 may comprise at least two power supplies 34. In this case, at least one of the at least two power supplies 34 may be disposed at the base member 12 and the rest of the at least two power supplies 34 may be disposed at the brake operating member 14.

When the power supply 34 and the electrical switch 24 are disposed at the same member out of the base member 12 and the brake operating member 14, the power supply 34 may be integrally provided with the electrical switch 24 as a single unit. When the power supply 34 and the electrical switch 24 are disposed at different members, the power supply 34 is electrically connected to the the electrical switch 24 via the electrical cable 36. When the power supply 34 and the wireless communication unit 26 are disposed at the same member out of the base member 12 and the brake operating member 14, the power supply 34 may be integrally provided with the wireless communication unit 26 as a single unit. When the power supply 34 and the wireless communication unit 26 are disposed at different members, the power supply 34 is electrically connected to the wireless communication unit 26 via the electrical cable 38. When the power supply 34 and the informing unit 30 are disposed at the same member out of the base member 12 and the brake operating member 14, the power supply 34 may be integrally provided with the informing unit 30 as a single unit. When the power supply 34 and the informing unit 30 are disposed at different members, the power supply 34 is electrically connected to the informing unit 30 via the electrical cable 40.

In this embodiment, the power supply 34 is electrically connected to at least one of the electrical switch 24, the wireless communication unit 26, and the informing unit 30 to supply electrical energy (e.g., a power source voltage) to the at least one of the electrical switch 24, the wireless communication unit 26, and the informing unit 30. The power supply 34 supplies the power to other elements than the electrical switch 24, the wireless communication unit 26, and the informing unit 30.

In this embodiment, the power supply 34 includes a battery 34A, a battery holder 34B, an electric-energy generation element 34C, and a rectifying circuit 34D. Examples of the battery 34A include a primary battery such as a lithium manganese dioxide battery, and a secondary battery such as a lithium-ion secondary battery. In this embodiment, the battery 34A is a primary button battery. The battery 34A is held in the battery holder 34B. The electric-energy generation element 34C generates the electric energy using pressure and/or vibration. In this embodiment, the electric-energy generation element 34C generates electric energy (e.g., alternating current) using pressure and/or vibration caused by a movement of the brake operating member 14 relative to the base member 12. The electric-energy generation element 34C can include a piezoelectric element. As seen in FIG. 1, the electric-energy generation element 34C can be disposed at one of the base member 12 and the brake operating member 14. When the brake operating member 14 is moved relative to the base member 12 about the first pivot axis A1 in the first direction D1, the electric-energy generation element 34C hits on a striking member 35 which is disposed at the other of base member 12 and the brake operating member 14, then the electric-energy generation element 34C is pressed and/or vibrated. The electric-energy generation element 34C converts the pressure and/or the vibration caused by the movement of the brake operating member 14 to the electric energy (e.g., alternating current). The rectifying circuit 34D is connected to the electric-energy generation element 34C to rectify the electric energy generated by the electric-energy generation element 34C. Since the electric-energy generation element 34C and the rectifying circuit 34D have been well known in the electronics field, they will not be described and/or illustrated in detail here for the sake of brevity. The power source voltage is applied from the battery 34A to the wireless communication unit 26. For convenience of explanation, the electric-energy generation element 34C or the striking member 35 disposed at the base member 12 is not illustrated in FIG. 3.

The wireless communication unit 26 includes a voltage regulator 26F. The voltage regulator 26F regulates the power source voltage to a level at which various circuits of the wireless communication unit 26 and the informing unit 30 can properly operate. The voltage regulator 26F supplies the regulated voltage to the processor 26A, the memory 26B, the signal generating circuit 26C, the signal transmitting circuit 26D, and the informing unit 30. The voltage regulator 26F can be provided in the power supply 34.

The voltage regulator 26F switches the power source voltage between the battery 34A and the electric-energy generation element 34C. At first, for example, the wireless communication unit 26 preferentially uses the electric energy generated by the electric-energy generation element 34C to transmit the wireless signal based on the electric signal. When the transmission of the wireless signal is completed using only the electric energy generated by the electric-energy generation element 34C, the voltage regulator 26F interrupts supply of the electric energy from the battery 34A to reduce the standby power consumption of the battery 34A. When the transmission of the wireless signal is not completed due to insufficient electric energy, the wireless communication unit 26 uses the electric energy supplied from the battery 34A to transmit the wireless signal based on the electric signal. The remaining electric energy generated by the electric-energy generation element 34C can be charged to a rechargeable battery (not shown) if necessary. In such an embodiment, the rechargeable battery is provided in the power supply 34 instead of or in addition to the battery 34A.

Second Embodiment

A bicycle operating device 210 in accordance with a second embodiment will be described below referring to FIGS. 5 to 7. For convenience of explanation, the electric-energy generation element 34C or the striking member 35 disposed at the base member 12 is not illustrated in FIG. 6. The bicycle operating device 210 has the same structure and/or configuration as those of the bicycle operating device 10 except for the arrangement of some elements. Thus, elements having substantially the same function as those in the first embodiment will be numbered the same here, and will not be described and/or illustrated again in detail here for the sake of brevity.

Figure 5:
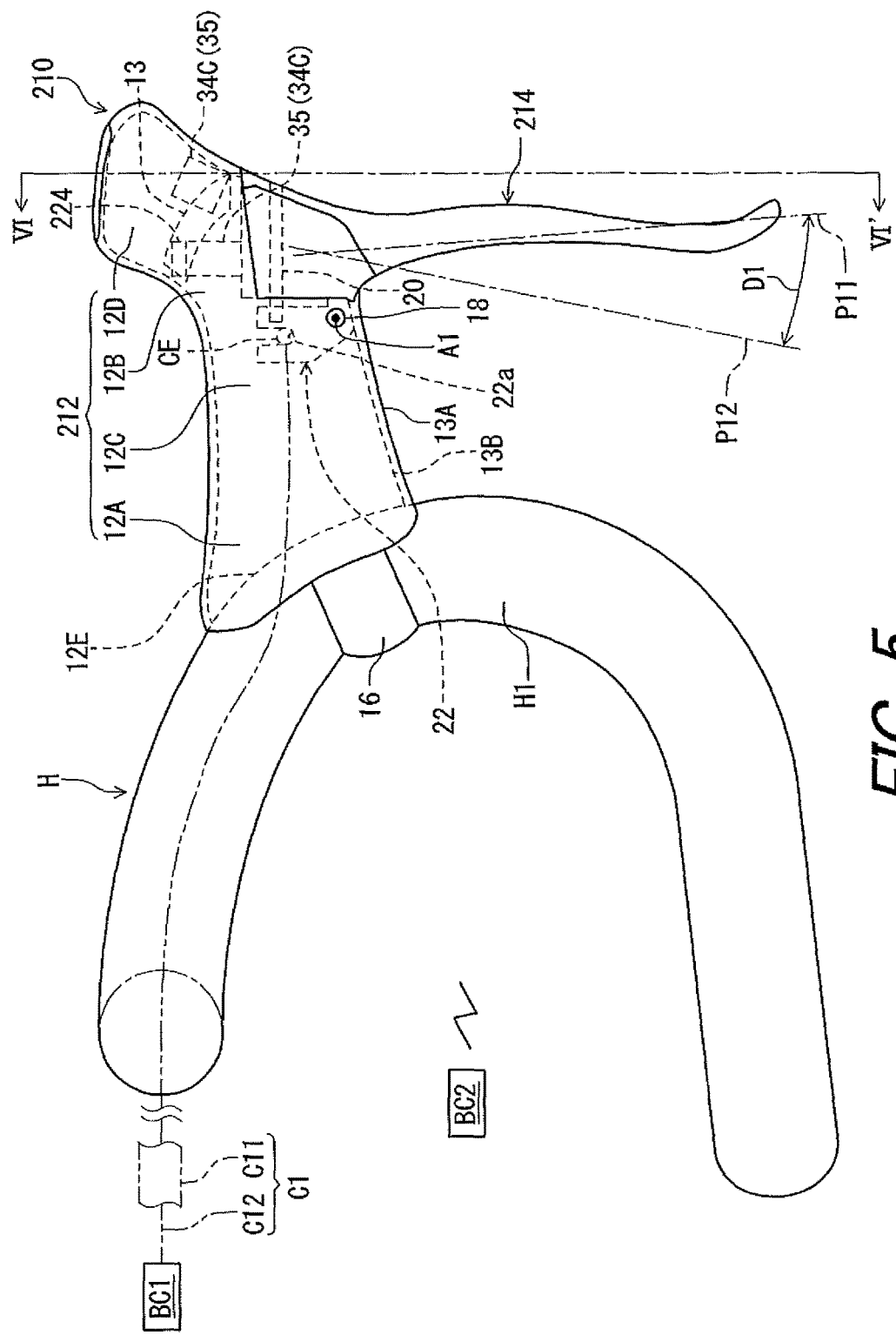
FIG. 5 is a right side elevational view of a bicycle handle provided with a bicycle operating device in accordance with a second embodiment.
Figure 6:
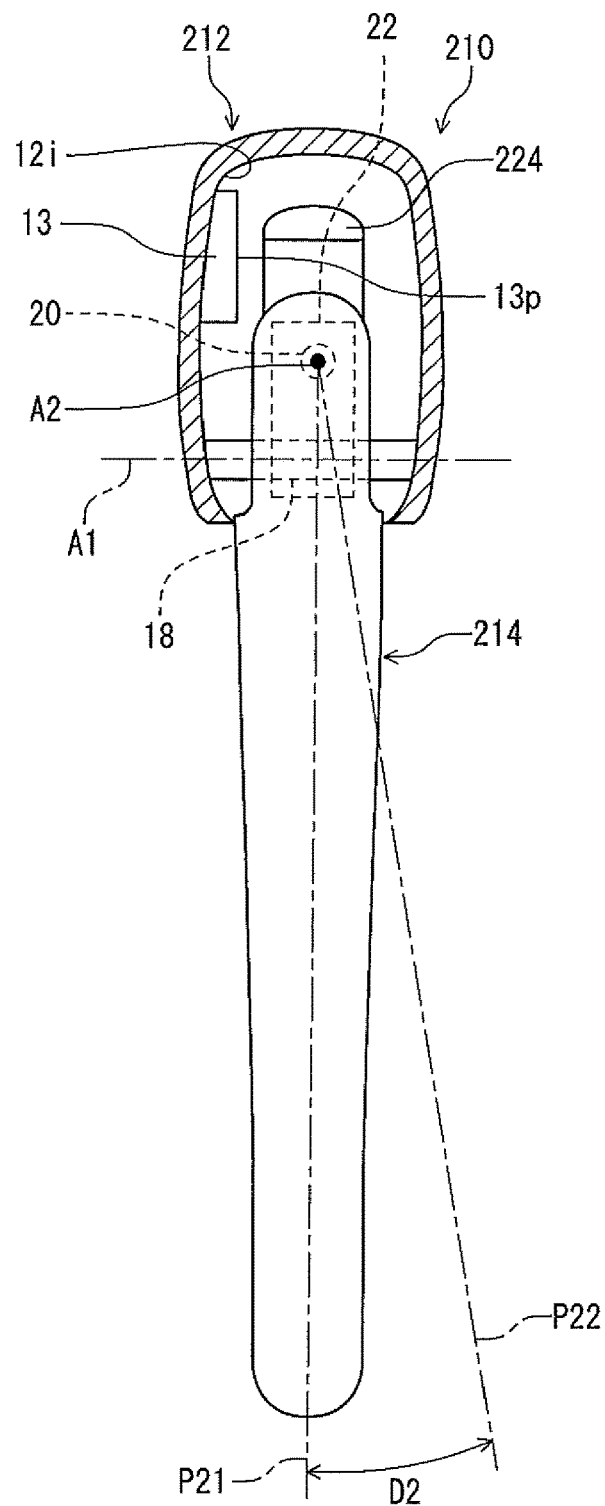
FIG. 6 is a cross-sectional view of the bicycle operating device taken along line VI-VI' of FIG. 5.
Figure 7:
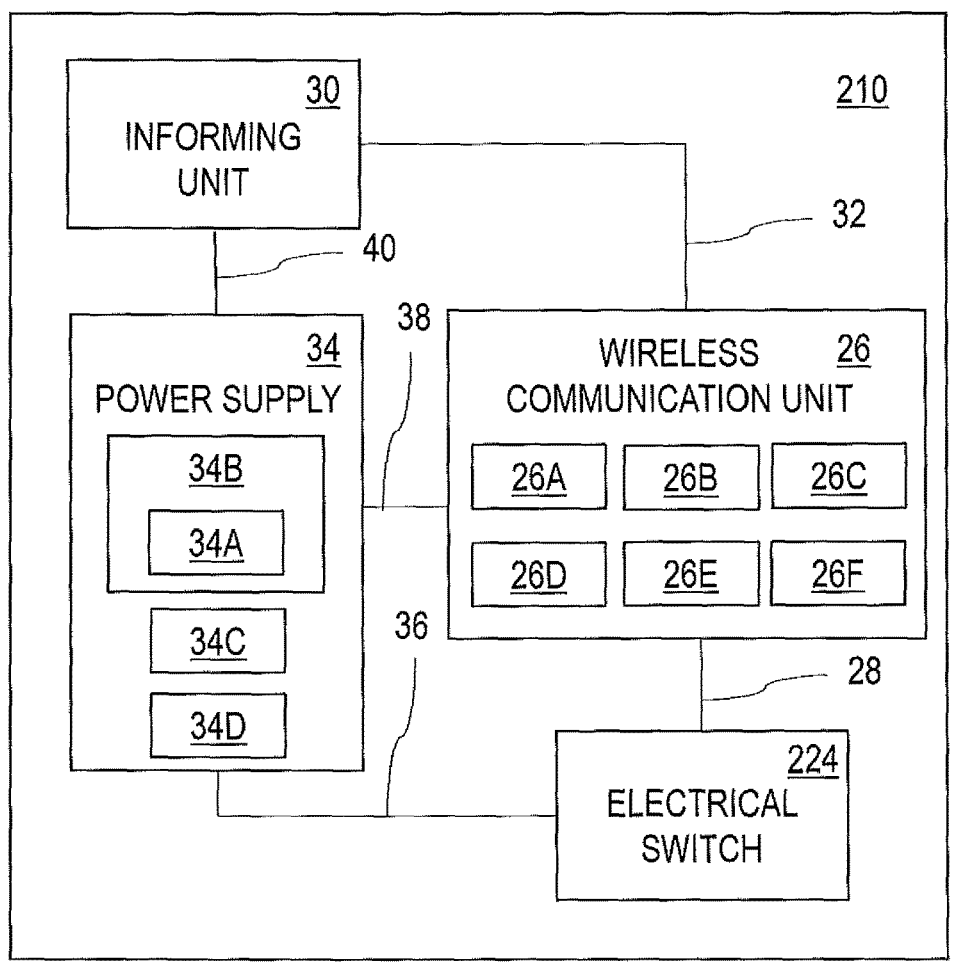
FIG. 7 is a schematic block diagram of the bicycle operating device illustrated in FIG. 5.

As seen in FIGS. 5 to 7, the bicycle operating device 210 comprises the base member 212, the brake operating member 214, the electrical switch 224, the wireless communication unit 26, the informing unit 30, and the power supply 34. Unlike the bicycle operating device 10 of the first embodiment, the electrical switch 224 is disposed at the brake operating member 214. The base member 212 includes an actuation part 13 disposed to face the electrical switch 224 in the second direction D2 to press the electrical switch 224 in response to a relative movement occurring between the brake operating member 14 and the base member 212. In the second embodiment, the second direction D2 may be also an anticlockwise direction (a leftward direction) viewed from the front of the bicycle operating device 10 or an clockwise direction (a rightward direction) viewed from the front of the bicycle operating device 10.

In FIGS. 5 and 6, the electrical switch 224 is disposed at the top of the brake operating member 14, but the electrical switch 224 may be disposed at the left or right side of the brake operating member 14. The actuation part 13 is attached to an inner surface 12i of base member 212. The actuation part 13 includes a projection 13p to face the electrical switch 224. In the FIG. 6, the projection 13p protrudes toward the brake operating member 214 from the inner surface 12i.

In this embodiment, in FIG. 7, when the wireless communication unit 26 is disposed at the brake operating member 214, the wireless communication unit 26 may be integrally provided with the electrical switch 224 as a single unit. When the wireless communication unit 26 is disposed at the base member 212, the wireless communication unit 26 is electrically connected to the electrical switch 224 via the electrical cable 28. When the wireless communication unit 26 and the electrical switch 224 are disposed in different places in the brake operating member 14, for example, the electrical switch 224 is disposed at the top of the brake operating member 14 and the wireless communication unit 26 is disposed at lower place of the brake operating member 14 with respect to the top of the brake operating member 14, the wireless communication unit 26 may be electrically connected to the electrical switch 224 via the electrical cable 28.

Third Embodiment

A bicycle operating device 310 in accordance with a third embodiment will be described below referring to FIG. 8. The bicycle operating device 310 has the same structure and/or configuration as those of the bicycle operating device 10 or 210 except for the arrangement of some elements. Thus, elements having substantially the same function as those in the above embodiment will be numbered the same here, and will not be described and/or illustrated again in detail here for the sake of brevity.

Figure 8:
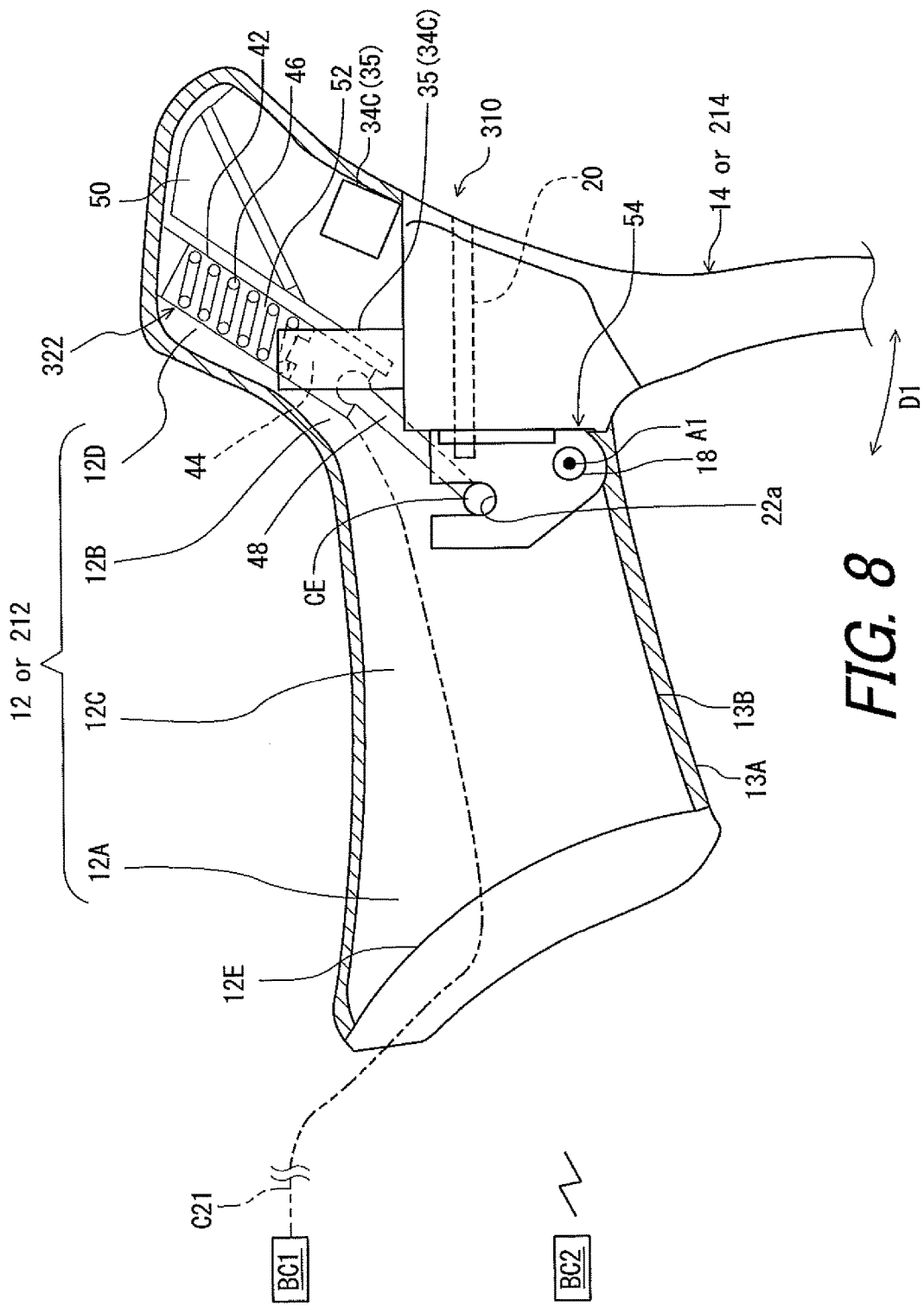
FIG. 8 is a cross-sectional view of a bicycle operating device in accordance with a third embodiment.

As seen in FIG. 8, the bicycle operating device 310 comprises the base member 12 or 212, the brake operating member 14 or 214. Similarly to the first and second embodiment, the bicycle operating device 310 comprises the electrical switch 24 or 224, the wireless communication unit 26, the informing unit 30, and the power supply 34 as seen in FIGS. 4 and 7.

Unlike the bicycle operating device 10 or 210 of the first or second embodiment, the bicycle operating device 310 further comprise a hydraulic unit 322 instead of the cable operating structure 22. The hydraulic unit 322 is coupled to the brake operating member 14 or 214 to generate a hydraulic pressure in response to a movement of the brake operating member 14 or 214 in the first direction D1. Specifically, the hydraulic unit 322 includes a hydraulic cylinder 42, a piston 44, a return spring 46, a piston rod 48, and a hydraulic reservoir 50. The piston 44 is movably disposed in the hydraulic cylinder 42. The hydraulic cylinder 42 and the piston 44 define a hydraulic chamber 52. The return spring 46 is provided in the hydraulic chamber 52 to bias the piston 44 toward an initial position. The brake operating member 14 or 214 is coupled to the piston 44 via the piston rod 48 and a coupling member 54 which is similar to the cable operating structure 22. The hydraulic reservoir 50 is connected to the hydraulic chamber 52. The hydraulic chamber 52 is connected to the bicycle brake BC1 via a hydraulic hose C21. In this embodiment, the bicycle brake BC1 include a hydraulic brake.

Fourth Embodiment

A bicycle operating device 410 in accordance with a fourth embodiment will be described below referring to FIGS. 9 and 10. The bicycle operating device 410 has the same structure and/or configuration as those of the bicycle operating device 310 except for the base member 12 or 212. Thus, elements having substantially the same function as those in the above embodiment will be numbered the same here, and will not be described and/or illustrated again in detail here for the sake of brevity.

Figure 9:
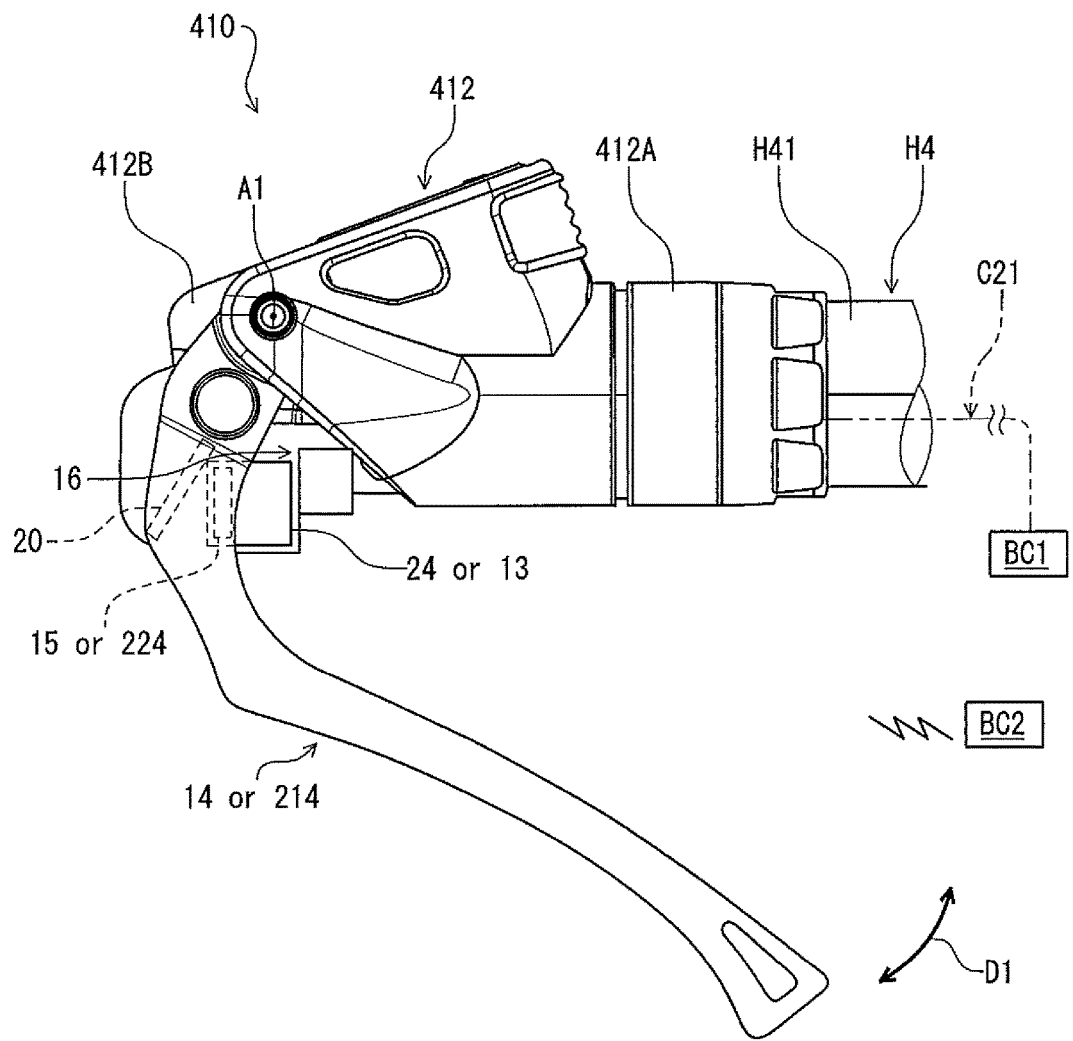
FIG. 9 is a partial left side elevational view of a bicycle operating device in accordance with a fourth embodiment.

As seen in FIG. 9, the bicycle operating device 410 comprises a base member 412, the brake operating member 14 or 214, the electrical switch 24 or 224. Similarly to the first and second embodiment, the bicycle operating device 410 comprises the wireless communication unit 26, the informing unit 30, and the power supply 34 as seen in FIGS. 4 and 7. The base member 412 has substantially the same structure as that of the base member 12 or 212 of one of the first to third embodiments. However, the bicycle operating device 410 is configured to be mounted to a bull horn handlebar H4 provided as the handlebar H. The bull horn handlebar H4 can also be referred to as the handlebar H4.

The base member 412 includes a first end portion 412A and a second end portion 412B. The first end portion 412A is configured to be coupled to the handlebar H4 in a mounting state where the bicycle operating device 410 is mounted to the handlebar H4. The second end portion 412B is opposite to the first end portion 412A. The brake operating member 14 or 214 is movably coupled to the second end portion 412B. However, the first end portion 412A is configured to be coupled to a bar end H41 of the handlebar H4 in the mounting state.

Figure 10:
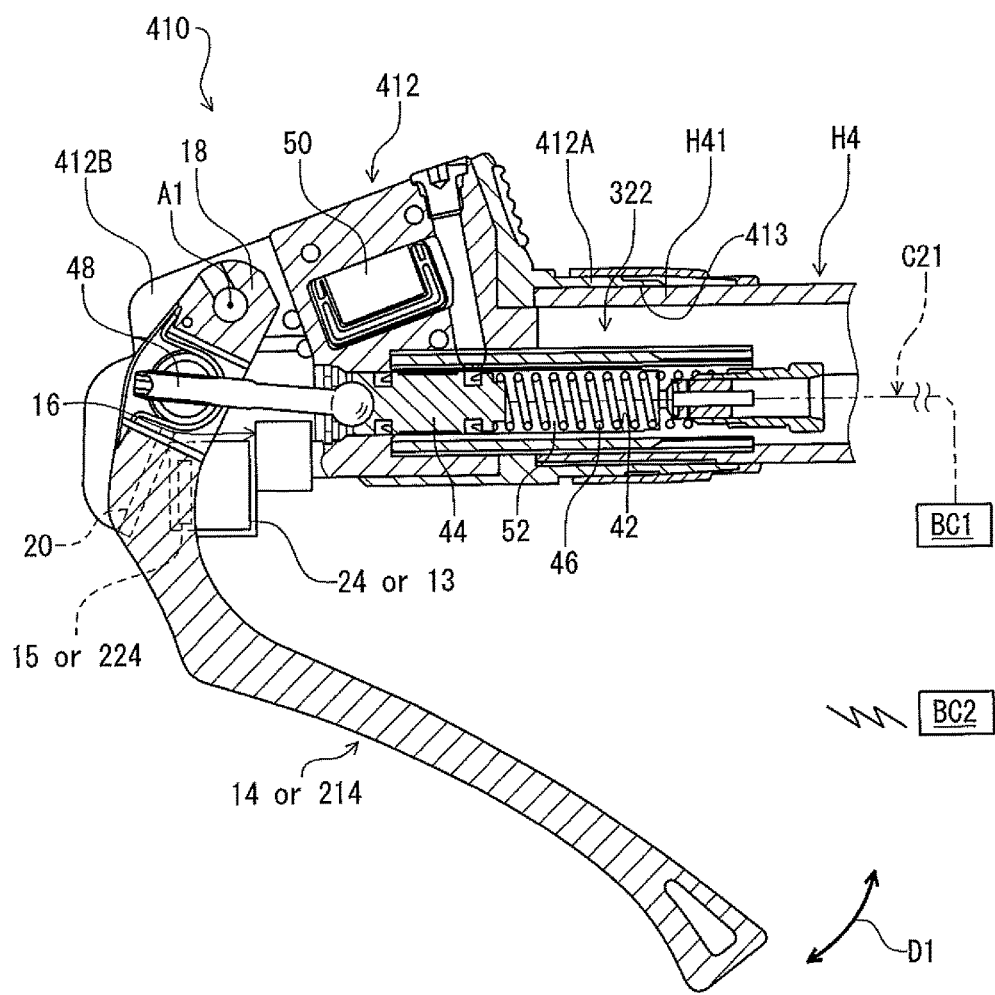
FIG. 10 is a cross-sectional view of the bicycle operating device illustrated in FIG. 9.

As seen in FIG. 10, the base member 412 includes a mounting hole 413 disposed at the first end portion 412A. The bar end H41 of the handlebar H4 is disposed in the mounting hole 413. The hydraulic unit 322 is at least partly disposed in the bar end H41 of the handlebar H4. The cable operating structure 22 of the bicycle operating device 10 or 210 can be applied to the bicycle operating device 410 instead of the hydraulic unit 322.

The bicycle operating device 10, 210, 310, or 410 has the following features.

(1) The bicycle operating device 10, 210, 310, or 410 comprises the base member 12, 212, or 412, the brake operating member 14 or 214, the electrical switch 24 or 224, and the wireless communication unit 26. The brake operating member 14 or 214 is movable relative to the base member 12, 212, or 412 in the first direction D1 and movable relative to the base member 12, 212, or 412 in the second direction D2 different from the first direction D1. The electrical switch 24 or 224 is disposed at one of the base member 12, 212, or 412, the brake operating member 14 or 214 to provide an electric signal in response to a movement of the brake operating member 14 or 214 in the second direction. The wireless communication unit 26 is connected to the electrical switch 24 or 224 to transmit the wireless signal based on the electric signal. Thus, it is possible to move the brake operating member 14 or 214 in the second direction D2 to turn on the electrical switch 24 or 224 for a different operation (e.g. gear shift, seatpost operation, and electric suspension operation) from a braking operation. This can simplify the structure of the bicycle operating device 10, 210, 310, or 410 for at least two operations. The bicycle operating device 10, 210, 310, or 410 also enables to wirelessly operate the electrical bicycle component with a simple structure.

(2) The wireless communication unit 26 is disposed at one of the base member 12, 212, or 412 and the brake operating member 14 or 214. Accordingly, it is possible to handle the bicycle operating device 10, 210, 310, or 410 having the wireless communication unit 26 and the electrical switch 24 or 224 in a single unit or in two different units that are disposed adjacent to each other and connected by a short electrical wire.

(3) In the bicycle operating device 10, or in the bicycle operating device 310 or 410 including the features of the bicycle operating device 10, the electrical switch 24 is disposed at the base member 12 or 412, and that the brake operating member 14 includes the actuation part 15 disposed to face the electrical switch 24 in the second direction D2 to press the electrical switch 24 in response to a relative movement occurring between the brake operating member 14 and the base member 12 or 412. Accordingly, it is possible to easily press the electrical switch 24 using the relative movement occurring between the brake operating member 14 and the base member 12 or 412.

(4) In the bicycle operating device 10, or in the bicycle operating device 310 or 410 including the features of the bicycle operating device 10, the actuation part 15 includes the projection 15p to face the electrical switch 24. Accordingly, it is possible to transmit the relative movement occurring between the brake operating member 14 and the base member 12 or 412 to the electrical switch 24 using the projection 15p.

(5) In the bicycle operating device 210, or in the bicycle operating device 310 or 410 including the features of the bicycle operating device 210, the electrical switch 224 is disposed at the brake operating member 214, and that the base member 212 or 412 includes an actuation part 13 disposed to face the electrical switch 224 in the second direction D2 to press the electrical switch 224 in response to a relative movement occurring between the brake operating member 214 and the base member 212 or 412. Accordingly, it is possible to easily press the electrical switch 224 using the relative movement occurring between the brake operating member 214 and the base member 212 or 412.

(6) In the bicycle operating device 210, or in the bicycle operating device 310 or 410 including the features of the bicycle operating device 210, the actuation part 13 includes a projection 13p to face the electrical switch 224. Accordingly, it is possible to transmit the relative movement occurring between the brake operating member 214 and the base member 212 or 412 to the electrical switch 224 using the projection 13p.

(7) The bicycle operating device 10 or 210, or the bicycle operating device 410 which includes the cable operating structure 22 comprises a cable operating structure 22 coupled to the brake operating member 14 or 214 to move a mechanical control cable C1 in response to a movement of the brake operating member 14 or 214 in the first direction D1. Accordingly, it is possible to respectively perform the braking operation and the different operation via the mechanical control cable C1 and the wireless communication.

(8) The bicycle operating device 310 or the bicycle operating device 410 including the features of the bicycle operating device 310 comprises a hydraulic unit 322 coupled to the brake operating member 14 or 214 to generate a hydraulic pressure in response to a movement of the brake operating member 14 or 214 in the first direction D1. Accordingly, it is possible to respectively perform the braking operation and the different operation via the hydraulic fluid and the wireless communication.

(9) The bicycle operating device 10, 210, 310, or 410 comprises the informing unit 30 disposed on at least one of the base member 12, 212, or 412 and the brake operating member 14 or 214. Accordingly, it is possible to inform a user of information relating to the bicycle operating device.

(10) In the bicycle operating device 10, 210, 310, or 410, the informing unit 30 is connected to the wireless communication unit 26 to inform a user of a status of the wireless communication unit 26. Accordingly, it is possible to check the status of the wireless communication unit 26.

(11) In the bicycle operating device 10, 210, 310, or 410, the base member 12, 212, or 412 includes the first end portion 12A or 412A and the second end portion 12B or 412B. The first end portion 12A or 412A is configured to be coupled to the handlebar H or H4 in a mounting state where the bicycle operating device 10, 210, 310, or 410 is mounted to the handlebar H or H4. The second end portion 12B or 412B is opposite to the first end portionl2A or 412A. The brake operating member 14 or 214 is movably coupled to the second end portion 12B or 412B. Thus, it is possible to provide a distance between the handlebar H or H4 and the brake operating member 14 or 214. Accordingly, it is possible to prevent interference between the handlebar H or H4 and the brake operating member 14 or 214.

(12) In the bicycle operating device 10, 210, or 310 to be coupled to the handlebar H, the first end portion 12A includes a mounting surface 12E having a curved shape corresponding to a drop-down handlebar H. Accordingly, it is possible to firmly fix the bicycle operating device 10, 210, or 310 to the drop-down handlebar H.

(13) In the bicycle operating device 10, 210, or 310 to be coupled to the handlebar H, the base member 12 or 212 includes the grip portion 12C arranged between the first end portion 12A and the second end portion 12B. Accordingly, the grip portion 12C allows the user to easily operate the brake operating member 14 or 214.

(14) In the bicycle operating device 10, 210, or 310 to be coupled to the handlebar H, the second end portion 12B includes the pommel portion 12D. Accordingly, the pommel portion 12D allows the user to lean on the base member 12 or 212 during riding a bicycle.

(15) In the bicycle operating device 410 to be coupled to the handlebar H4, the first end portion 412A is configured to be coupled to the bar end H41 of the handlebar H4 in the mounting state. Accordingly, it is possible to utilize the bicycle operating device 410 as a bar-end operating device.

(16) The bicycle operating device 10, 210, 310, or 410 further comprises the power supply 34 electrically connected to at least one of the electrical switch 24 or 224 and the wireless communication unit 26. Accordingly, it is possible to supply electric power to the at least one of the electrical switch 24 or 224 and the wireless communication unit 26.

(17) In the bicycle operating device 10, 210, 310, or 410, the power supply 34 is disposed on at least one of at one of the base member 12, 212, or 412 and the brake operating member 14 or 214. Accordingly, it is possible to handle the bicycle operating device 10, 210, 310, or 410 having the wireless communication unit 26, the electrical switch 24 or 224, and the power supply 34 in a single unit or in two different units that are disposed adjacent to each other and connected by a short electrical wire.

It will be apparent to those skilled in the bicycle field from the present disclosure that the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
    a base member;
    an electrical switch disposed at the base member;
    a brake operating member that is a single one-piece member and is movably coupled to the base member, the brake operating member including an operating structure movable relative to the base member in a first direction, the operating structure including:
        a user interface movable relative to the base member in a second direction different from the first direction; and
        a switch operating member provided fixedly on the user interface in the base member, the switch operating member being configured to contact the electrical switch to cause the electrical switch to provide an electric signal when the brake operating member is moved in the second direction regardless of a movement of the brake operating member in the first direction; and
    a wireless communication unit connected to the electrical switch to transmit a wireless signal based on the electric signal.

2. The bicycle operating device according to claim 1, wherein
    the wireless communication unit is disposed at one of the base member and the brake operating member.

3. The bicycle operating device according to claim 1, wherein
    the electrical switch is disposed at the base member, and
    the brake operating member includes the switch operating member disposed to face the electrical switch in the second direction to press the electrical switch in response to a relative movement occurring between the brake operating member and the base member.

4. The bicycle operating device according to claim 3, wherein
    the switch operating member includes a projection to face the electrical switch.

5. The bicycle operating device according to claim 1, further comprising:

a cable operating structure coupled to the brake operating member to move a mechanical control cable in response to a movement of the brake operating member in the first direction.

6. The bicycle operating device according to claim 1, further comprising:
a hydraulic unit coupled to the brake operating member to generate a hydraulic pressure in response to a movement of the brake operating member in the first direction.

7. The bicycle operating device according to claim 1, further comprising
an informing unit disposed on at least one of the base member and the brake operating member.

8. The bicycle operating device according to claim 7, wherein
the informing unit is connected to the wireless communication unit to inform a user of a status of the wireless communication unit.

9. The bicycle operating device according to claim 1, wherein
the base member includes
a first end portion configured to be coupled to a handlebar in a mounting state where the bicycle operating device is mounted to the handlebar, and
a second end portion opposite to the first end portion, and the brake operating member is movably coupled to the second end portion.

10. The bicycle operating device according to claim 9, wherein
the first end portion includes a mounting surface having a curved shape corresponding to a drop-down handlebar.

11. The bicycle operating device according to claim 9, wherein
the base member includes a grip portion arranged between the first end portion and the second end portion.

12. The bicycle operating device according to claim 9, wherein
the second end portion includes a pommel portion, and the electrical switch and the brake operating member are disposed in the pommel portion.

13. The bicycle operating device according to claim 9, wherein
the first end portion is configured to be coupled to a bar end of a handlebar in the mounting state.

14. The bicycle operating device according to claim 1, further comprising
a power supply electrically connected to at least one of the electrical switch and the wireless communication unit.

15. The bicycle operating device according to claim 14, wherein
the power supply is disposed on at least one of the base member and the brake operating member.

16. The bicycle operating device according to claim 1, wherein an entirety of the switch operating member is disposed in the base member.

17. A bicycle operating device comprising:
a base member including:
a first end portion configured to be coupled to a handlebar in a mounting state where the bicycle operating device is mounted to the handlebar; and
a second end portion provided opposite to the first end portion and including a pommel portion;
a brake operating member movably coupled to the second end portion, the brake operating member being movable relative to the base member in a first direction and movable relative to the base member in a second direction different from the first direction;
an electrical switch provided on one of the base member in the pommel portion and the brake operating member in the pommel portion;
a switch operating member provided fixedly on another of the base member and the brake operating member, the switch operating member being configured to contact the electrical switch to cause the electrical switch to provide an electric signal when the brake operating member is moved in the second direction regardless of a movement of the brake operating member in the first direction; and
a wireless communication unit connected to the electrical switch to transmit a wireless signal based on the electric signal.

18. A bicycle operating device comprising:
a base member;
a switch operating member disposed at the base member;
a brake operating member that is a single one-piece member and is movably coupled to the base member, the brake operating member including an operating structure movable relative to the base member in a first direction, the operating structure including:
a user interface movable relative to the base member in a second direction different from the first direction; and
an electrical switch provided fixedly on the user interface in the base member, the switch operating member being configured to contact the electrical switch to cause the electrical switch to provide an electric signal when the brake operating member is moved in the second direction regardless of a movement of the brake operating member in the first direction; and
a wireless communication unit connected to the electrical switch to transmit a wireless signal based on the electric signal.

19. The bicycle operating device according to claim 18, wherein
the electrical switch is disposed at the brake operating member, and
the base member includes the switch operating member disposed to face the electrical switch in the second direction to press the electrical switch in response to a relative movement occurring between the brake operating member and the base member.

20. The bicycle operating device according to claim 19, wherein
the switch operating member includes a projection to face the electrical switch.

* * * * *